(No Model.)
J. HARTFORD.
PLUMBER'S TRAP.
No. 444,751.
Patented Jan. 13, 1891.
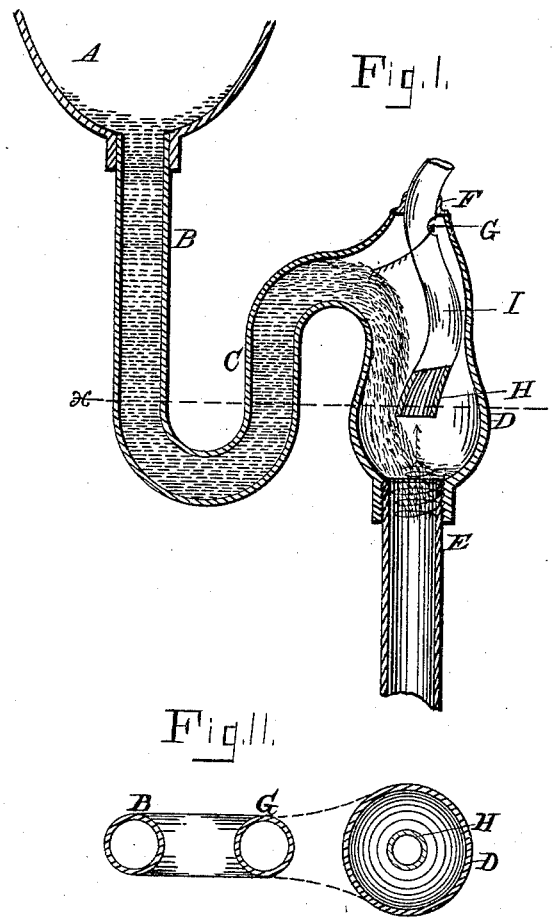
Fig. I.
Fig. II.
Witnesses:
Simeon J. Andrews
M. M. Seibert
Inventor,
John Hartford
By G. L. Chapin
His Attorney.

UNITED STATES PATENT OFFICE.

JOHN HARTFORD, OF CHICAGO, ILLINOIS.

PLUMBER'S TRAP.

SPECIFICATION forming part of Letters Patent No. 444,751, dated January 13, 1891.

Application filed June 3, 1890. Serial No. 354,157. (No model.)

*To all whom it may concern:*

Be it known that I, JOHN HARTFORD, a citizen of the United States, residing at Chicago, county of Cook, and State of Illinois, have invented new and useful Improvements in Plumbers' Traps, of which the following is a specification, reference being had to the annexed drawings, illustrating the invention, in which—

Figure I is a longitudinal vertical sectional elevation of a plumber's trap connected with a bowl and provided with my improvement. Fig. II is a horizontal section of Fig. I on line X.

The purpose of this invention is by simple means to conduct obnoxious gases directly from the discharge-pipe to the gas-escape pipe and to prevent a rotation of the water in the trap, so that no open center through the moving column of water can be formed for the escape of gas to an apartment. Peppermint-oil tests show that when in use there is no other plumber's trap but will when the oil is applied to a sewer manifest itself in a compartment when the bowl, sink, or other plumber's receptacle is located, and that what is known as the "plumber's seal" is only perfect when the trap is not in use.

In traps now in general use the gas-escape pipe or ventilation pipe is placed at the crown of the last turn of the pipe, so that when the water is flowing through the trap it interposes between the ventilation and the discharge-pipe. When the water is flowing out of the trap against an upward pressure of sewer-gas, the gas is found to impinge against the weaker portion of the column of water, which is its center, and by the united action of the descending column of water and the upward pressure of gas the column of water its entire length has given to it a spiral motion around a small central opening, through which the sewer-gas passes and enters a compartment. I prevent the escape of gas into a compartment by one mechanism, which serves two purposes. I insert in the enlarged end of the trap a pipe which communicates with the ventilating-pipe and extends nearly to the discharge-pipe, so that gas passing up the latter pipe will enter it and pass out at the ventilating-pipe, no matter what motion the water may have or how full the lower portion of the trap may be of water. In case the trap be sealed, as when the water is at rest, the side opening in the inner pipe permits any accumulated gas which may by any means be generated within the crown of the enlarged portion of the trap to pass out. When a column of water is started in the trap, it flows against the inserted pipe, and it is so broken that a spiral motion cannot be started within the trap portions B C.

The trap B C D is constructed substantially like the standard trap, except the portion D is enlarged to contain what it should were not the pipe I inserted therein. This pipe is preferably curved, as shown, to leave a greater area of the portion D between it and the portion C for the free passage of water. The pipe, however, may have a less curve and serve a good purpose; but I find the curve shown to serve the best purpose. The top end of the pipe may connect with the ordinary escape by any suitable means, or it may extend through the crown at F and form a part of the escape-pipe. The pipe I should be a substantial fixture and be provided with an opening G under the crown for the escape of gas entering the enlarged portion D, as it does when the trap is sealed.

A trap constructed as herein specified and shown has been thoroughly tested and found to operate as described, preventing gas from entering compartments.

Plumbers' traps consisting of siphon-pipes with an enlarged intermediate portion between the pipes and the discharge-pipe are not new with applicant, but are shown in the patent to James Sargent on January 22, 1878. A ventilating-pipe is also shown attached to the outer top portion of the enlarged part. I therefore confine my invention to the matter set forth in the claim.

I claim as new and desire to secure by Letters Patent of the United States—

In a plumber's siphon-trap having an enlarged portion between the siphon-pipes and the discharge-pipe, a pipe inserted within the enlarged portion and extending down to near the discharge-pipe to form a direct passage to the ventilating-pipe and in position to prevent the rotary motion of water passing through the trap, and a small opening in and near the upper end of the pipe to prevent the accumulation of gas in the top of the large chamber, as specified.

JOHN HARTFORD.

Witnesses:
 G. L. CHAPIN,
 K. A. CRAWFORD.